United States Patent
Lee et al.

(10) Patent No.: US 10,673,930 B2
(45) Date of Patent: Jun. 2, 2020

(54) MOBILE TERMINAL AND CONTROL METHOD THEREFOR

(71) Applicant: LG ELECTRONICS INC., Seoul (KR)

(72) Inventors: Junho Lee, Seoul (KR); Hyun Jeong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 223 days.

(21) Appl. No.: 16/068,166

(22) PCT Filed: Feb. 19, 2016

(86) PCT No.: PCT/KR2016/001663
§ 371 (c)(1),
(2) Date: Jul. 5, 2018

(87) PCT Pub. No.: WO2017/122863
PCT Pub. Date: Jul. 20, 2017

(65) Prior Publication Data
US 2019/0028532 A1    Jan. 24, 2019

(30) Foreign Application Priority Data
Jan. 11, 2016    (KR) .................. 10-2016-0003383

(51) Int. Cl.
*H04L 29/08*    (2006.01)
*H04W 84/20*    (2009.01)
(Continued)

(52) U.S. Cl.
CPC .............. *H04L 67/06* (2013.01); *G06F 16/16* (2019.01); *G06F 16/176* (2019.01);
(Continued)

(58) Field of Classification Search
CPC ... H04L 67/06; H04L 65/1059; G06F 16/176; G06F 16/16; G06F 16/182; H04M 2250/64
See application file for complete search history.

(56) References Cited

U.S. PATENT DOCUMENTS

| | | | |
|---|---|---|---|
| 2007/0189718 A1* | 8/2007 | Kobayashi | G11B 20/00086 386/230 |
| 2008/0168084 A1* | 7/2008 | Nara | G11B 27/105 |

(Continued)

FOREIGN PATENT DOCUMENTS

| | | |
|---|---|---|
| KR | 10-2009-0022613 A | 3/2009 |
| KR | 10-2013-0020383 A | 2/2013 |
| KR | 10-2013-0129760 A | 11/2013 |

*Primary Examiner* — Kyung H Shin
(74) *Attorney, Agent, or Firm* — Birch, Stewart, Kolasch & Birch, LLP

(57) ABSTRACT

The present invention relates to a mobile terminal for executing a file reproduction function, the mobile terminal comprising: a wireless communication unit configured to perform communication with an external terminal; and a control unit for forming a network for file sharing with the external terminal, receiving a file path corresponding to a specific file from the external terminal, so as to allow the mobile terminal to access the external terminal through the formed network and reproduce a file, and generating a reproduction list which includes a file path pre-stored in the mobile terminal and the file path received from the external device, wherein, when a file to be currently reproduced among files included in the reproduction list corresponds to a file, the file path of which has been received from the external terminal, the control unit accesses the external terminal through the formed network and reproduces a file corresponding to the received file path by a streaming method, on the basis of the received file path, and when a file to be currently reproduced among files included in the (Continued)

reproduction list corresponds to a file path pre-stored in the mobile terminal, the control unit reproduces a file by a local reproduction method, on the basis of the file path pre-stored in the mobile terminal.

20 Claims, 13 Drawing Sheets

(51) Int. Cl.

| | | |
|---|---|---|
| *H04M 1/725* | (2006.01) | |
| *H04L 29/06* | (2006.01) | |
| *H04W 76/10* | (2018.01) | |
| *G06F 16/182* | (2019.01) | |
| *G06F 16/16* | (2019.01) | |
| *G06F 16/176* | (2019.01) | |
| *H04W 88/02* | (2009.01) | |

(52) U.S. Cl.
CPC ........ *G06F 16/182* (2019.01); *H04L 65/1059* (2013.01); *H04L 65/4069* (2013.01); *H04M 1/7253* (2013.01); *H04W 76/10* (2018.02); *H04W 84/20* (2013.01); *H04M 1/72558* (2013.01); *H04M 2250/64* (2013.01); *H04W 88/02* (2013.01)

(56) References Cited

U.S. PATENT DOCUMENTS

| | | | |
|---|---|---|---|
| 2008/0194202 A1* | 8/2008 | Song | G06F 16/40 455/41.2 |
| 2011/0055878 A1* | 3/2011 | Mizuno | H04L 12/413 725/80 |
| 2015/0133049 A1* | 5/2015 | Lee | H04W 4/60 455/41.1 |

\* cited by examiner

① CONTROL COMMAND FLOW
② DATA STREAM FLOW

MOBILE TERMINAL AND CONTROL METHOD THEREFOR

CROSS REFERENCE TO RELATED APPLICATIONS

This application is the National Phase of PCT International Application No. PCT/KR2016/001663, filed on Feb. 19, 2016, which claims priority under 35 U.S.C. 119(a) to Patent Application No. 10-2016-0003383, filed in Republic of Korea on Jan. 11, 2016, all of which are hereby expressly incorporated by reference into the present application.

TECHNICAL FIELD

The present invention relates to a mobile terminal capable of conveniently sharing files, and a method of controlling the same.

BACKGROUND ART

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display unit. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

In recent years, communication technologies have been developed for transmitting data between a server and a mobile terminal and between mobile terminals through networks.

Such networks may be realized by a Wi-Fi (Wireless-Fidelity) technology, a Bluetooth technology, or the like.

The mobile terminal can share data with another mobile terminal or a server located at a remote position or a nearby position by transmitting and receiving data through a network.

DETAILED DESCRIPTION OF THE DISCLOSURE

One aspect of the present invention is to provide a method of reproducing files stored in different mobile terminals.

Another aspect of the present invention is to provide a reproduction list for managing files stored in different mobile terminals.

Another aspect of the present invention is to provide a method of establishing a network between different mobile terminals.

To achieve these aspects and other advantages of the present invention, there is provided a mobile terminal for executing a file reproduction request function, the terminal including, a wireless communication unit to perform communication with an external terminal, and a controller to establish a network for file sharing with the external terminal, receive a file path corresponding to a specific file from the external terminal to reproduce the file by accessing the external terminal through the established network, and generate a reproduction list including file paths prestored in the mobile terminal and the file path received from the external terminal. The controller, when a file to be currently reproduced is a file whose file path has been received from the external terminal among files included in the reproduction list, may reproduce the file corresponding to the received file path in a streaming manner by accessing the external terminal through the established network based on the received file path, and reproduce the file in a local reproduction manner based on a file path prestored in the mobile terminal when the file to be currently reproduced is the file path prestored in the mobile terminal among the files included in the reproduction list.

In one embodiment, the controller may transmit a file reproduction request to the external terminal based on the file path received from the external terminal. The controller may then receive data for reproducing the file to be currently reproduced from the external terminal after the transmission of the reproduction request, and reproduce the file in the streaming manner.

In one embodiment, the controller may edit the reproduction list based on an edit command of the reproduction list when the edit command of the reproduction list is received from the external terminal. In one embodiment, the editing of the reproduction list may include changing a reproduction order, deleting a file included in the reproduction list, adding a file included in the reproduction list, pausing a reproduction and stopping a reproduction.

In one embodiment, when a file corresponding to a file path transmitted to the mobile terminal is a file stored in an external server, the external terminal may receive data for reproducing the file from the external server when a file reproduction request is received from the mobile terminal, and transmit the received data to the mobile terminal.

In one embodiment, the controller may transmit the reproduction list to the external terminal so that the files included in the reproduction list are available in the external terminal.

In one embodiment, the established network may include a first external terminal and a second external terminal. The controller may generate a file sharing group including the first external terminal and the second external terminal, receive a first file path corresponding to a first file from the first external terminal and a second file path corresponding to a second file from the second external terminal through the established network, and generate a reproduction list including the received first and second file paths.

In one embodiment, the controller may reproduce the first file in the streaming manner by accessing the first external terminal through the established network based on the first file path when the file to be currently reproduced among the files included in the reproduction list is the first file corresponding to the first file path, and reproduce the second file in the streaming manner by accessing the second external terminal through the established network based on the second file path when the file to be currently reproduced among the files included in the reproduction list is the second file corresponding to the second file path.

In one embodiment, the controller may transmit a reproduction request for the second file to the second external terminal when the reproduction request for the second file is received from the first external terminal, and transmit data for reproducing the second file to the first external terminal when the data for reproducing the second file is received from the second external terminal after the transmission of the reproduction request.

In one embodiment, the controller may reproduce the file in the mobile terminal using an equalizer function or a preset function of the first external terminal when the file to be currently reproduced among the files included in the reproduction list is the file of the first external terminal.

In one embodiment, the controller may delete the second file from the reproduction list when a deletion request for the second file included in the reproduction list is received from the first external terminal.

In one embodiment, when the first external terminal of the first and second external terminals is set to a host terminal in a state where the host terminal of the file sharing group has been set to the mobile terminal, the controller may transmit information related to the second external terminal to the first external terminal to establish a new network in which the first external terminal is set to the host terminal.

In one embodiment, the mobile terminal may be excluded from the newly-established network when the new network is established.

In one embodiment, a file path related to the mobile terminal may be excluded from the reproduction list included in the first external terminal when the mobile terminal is excluded from the newly-established network.

In one embodiment, the controller may transmit a file path for generating a reproduction list to the first external terminal set to the host terminal through the newly-established network.

In one embodiment, the first external terminal may establish a new network based on a reception of a network establishment request for file sharing from the second external terminal.

According to another embodiment of the present invention, there is provided a file reproduction method of a mobile terminal executing a file reproduction function, the method including establishing a network for file sharing with an external terminal, receiving in the mobile terminal a file path corresponding to a specific file from the external terminal to reproduce the file by accessing the external terminal through the established network, generating a reproduction list including file paths prestored in the mobile terminal and the file path received from the external terminal, and reproducing in a streaming manner a file corresponding to the received file path by accessing the external terminal through the established network based on the received file path when a file to be currently reproduced is the file corresponding to the file path received from the external terminal among files included in the generated reproduction list, and reproducing the file in a local reproduction manner based on a file path prestored in the mobile terminal when the file to be currently reproduced is the file path prestored in the mobile terminal among the files included in the reproduction list.

In one embodiment, the reproducing the file may include transmitting a file reproduction request to the external terminal based on the file path received from the external terminal, and reproducing the file in the streaming manner by receiving data for the file reproduction from the external terminal after the transmission of the reproduction request.

In one embodiment, in case where a file corresponding to a file path transmitted to the mobile terminal is a file stored in an external server, the external terminal may receive data for reproducing the file from the external server when a file reproduction request is received from the mobile terminal, and transmit the received data to the mobile terminal.

In one embodiment, the method may further include establishing a network including the mobile terminal as a host terminal, and first and second external terminals, setting the first external terminal of the first and second external terminals as a host terminal based on a control input, and transmitting information related to the second external terminal to the first external terminal to establish a new network having the first external terminal set as the host terminal.

Effect of the Disclosure

The present invention can share a file path of a file stored in each mobile terminal by establishing a network between the mobile terminals, such that files stored in one mobile terminal can be reproduced in another mobile terminal in a streaming manner. Thus, the present invention can minimize a memory usage when reproducing a file stored in an external terminal.

In addition, the present invention can generate a reproduction list using file paths received from mobile terminals included in a network, and sequentially reproduce files according to the generated reproduction list. Accordingly, the present invention can reproduce files through a preset network, even without establishing a separate network in order to reproduce the files.

BEST MODE OF THE DISCLOSURE

Figure 1A:
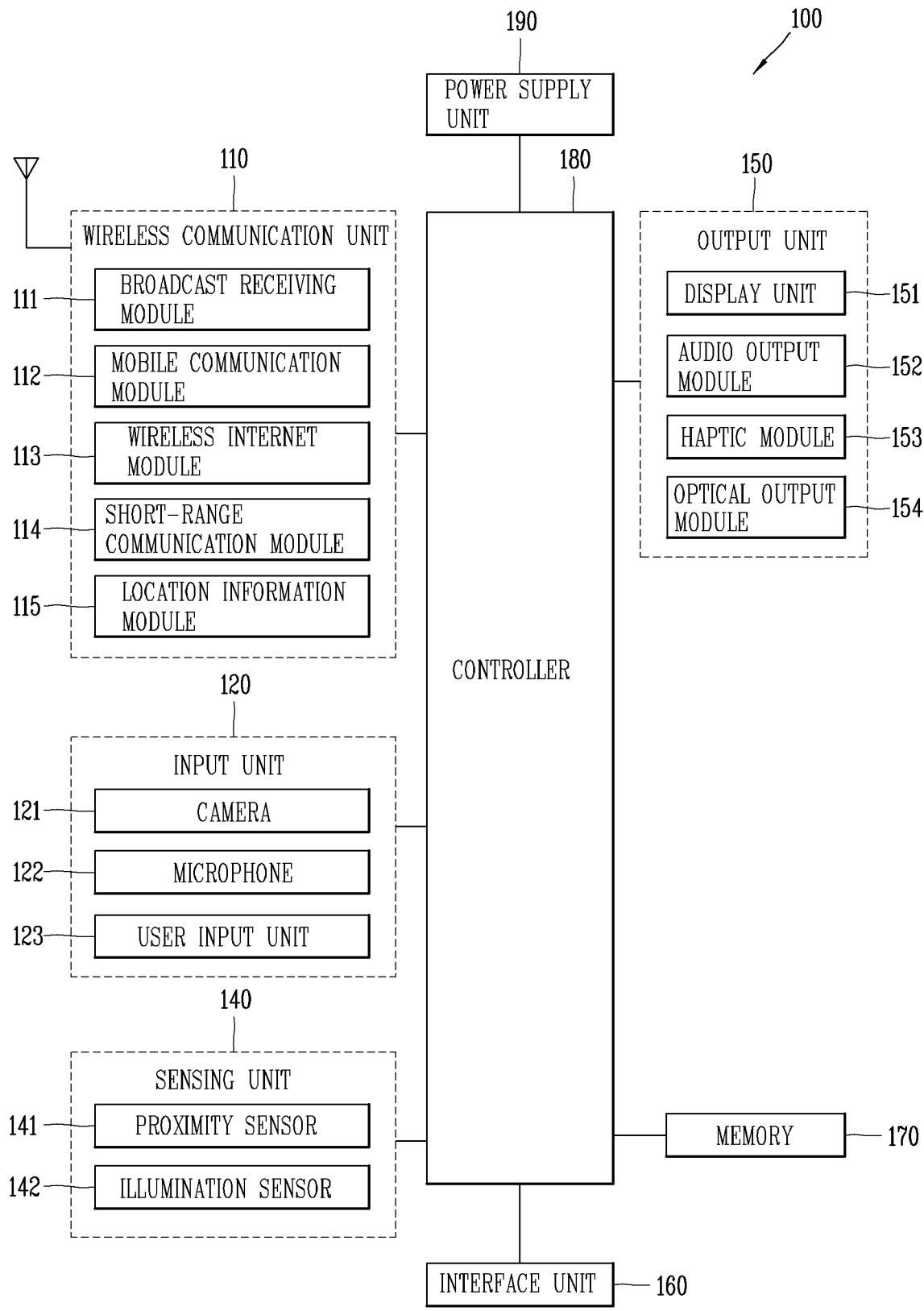
FIG. 1A is a block diagram of a mobile terminal in accordance with one exemplary embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
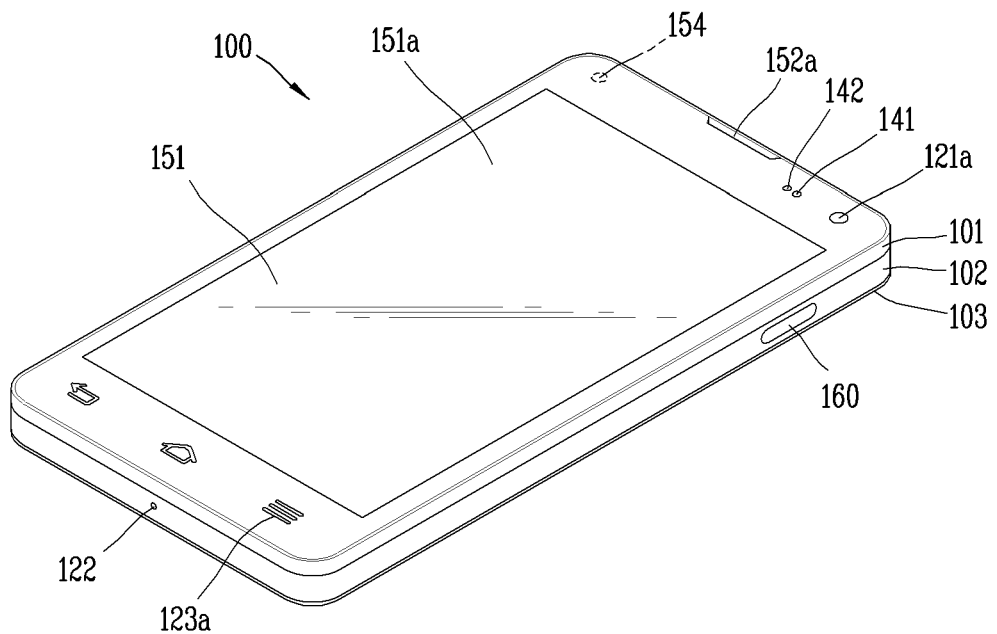
FIGS. 1B and 1C are conceptual views illustrating one example of a mobile terminal according to the present invention, viewed from different directions.
Figure 1C:
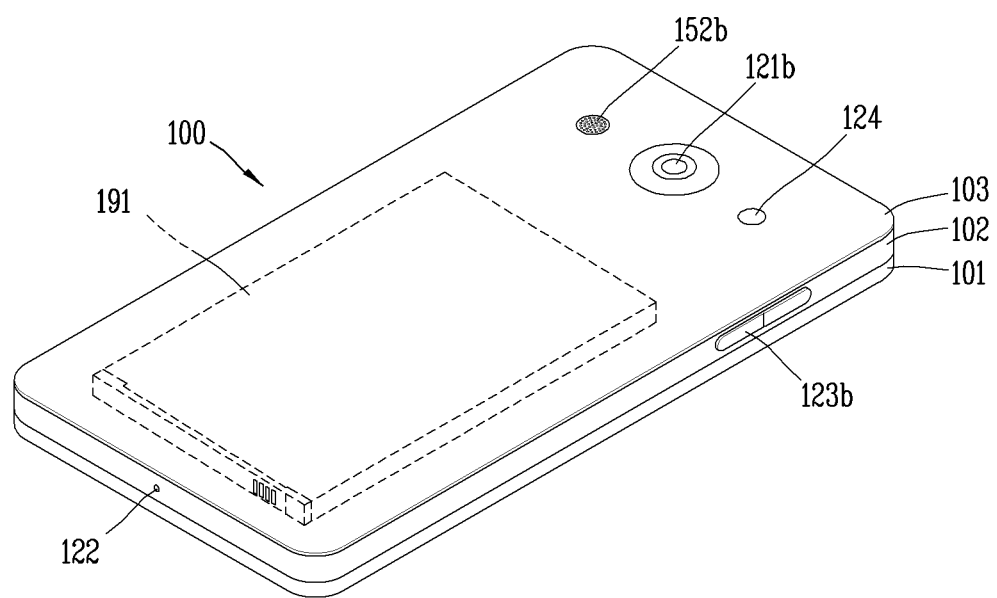

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area network.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

When the touch screen is implemented as a capacitance type, the proximity sensor 141 can sense proximity of a pointer relative to the touch screen by changes of an electromagnetic field, which is responsive to an approach of an object with conductivity. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.).

The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 1B and 1C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be specified.

On the other hand, the touch sensor may be configured in a form of a film having a touch pattern and disposed between a window 151a and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit (123, see FIG. 1A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia reproduction sounds.

The window 151a of the display unit 151 may include a sound hole for emitting sounds generated from the first audio output module 152a. However, the present invention is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Figure 2A:
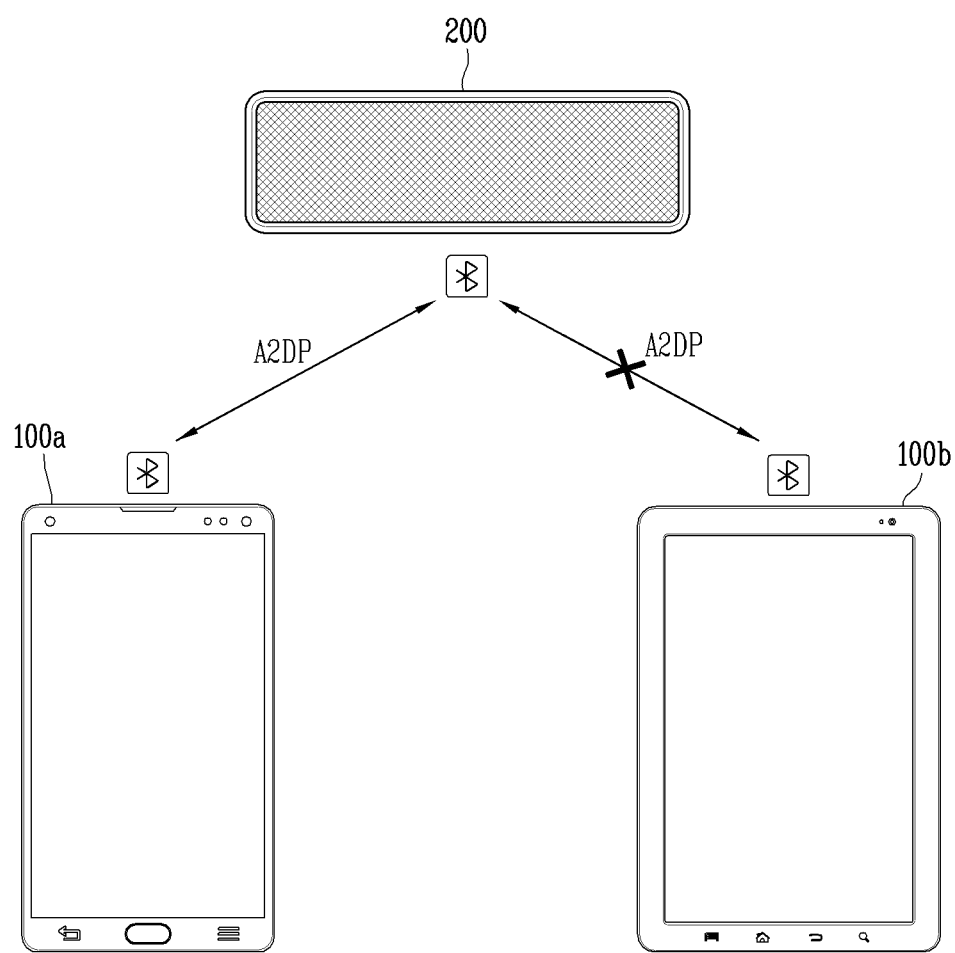
FIGS. 2A and 2B are conceptual views illustrating a network between a host terminal and an upload terminal.
Figure 2B:
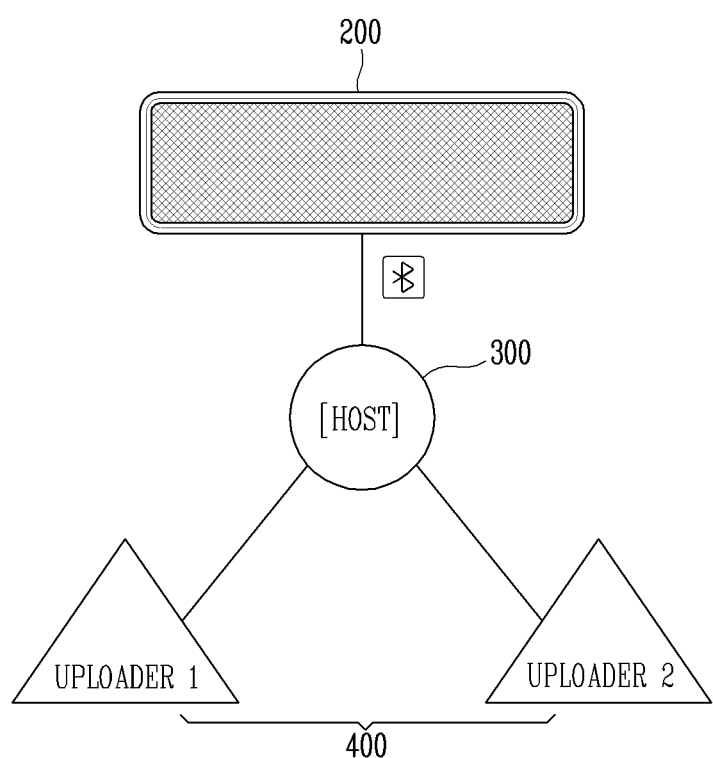

FIGS. 2A and 2B are conceptual views illustrating a network according to the present invention. Referring to FIG. 2B, a mobile terminal 100a may transmit data related to a file reproduction to a Bluetooth speaker 200 so that the file can be reproduced from the Bluetooth speaker 200 through an Advanced Audio Distribution Profile (A2DP) network as short-range communication. Here, the A2DP refers to a Bluetooth profile that delivers high-quality stereo sounds unlike HSP and HFP profiles that deliver mono sounds and are frequently used in telephone conversations. In addition, the file includes various files, such as a video file, a music file, a media file and the like that can be stored in the mobile terminal.

The Bluetooth speaker 200 may be connected to a plurality of terminals simultaneously through different communication networks such as an Advanced Audio Distribution Profile (A2DP) communication network, a Hands Free Profile (HFP) communication network, and the like. However, using the speaker for several mobile terminals through one communication network is not supported by the specification standard (ADVANCED AUDIO DISTRIBUTION PROFILE SPECIFICATION ver 13, page 14, Jul. 24, 2012).

The HFP (or Headset Profile (HSP)) refers to a Bluetooth profile that provides mono sound quality as a profile of a phone call purpose.

That is, referring to FIG. 2A, when one mobile terminal 100a is in a connected state to the Bluetooth speaker 200 through the A2DP communication network, another mobile terminal 100b cannot be connected to the Bluetooth speaker 200 through the A2DP. Accordingly, the user should inconveniently release the connection between the one mobile terminal 100a and the Bluetooth speaker 200 connected through the A2DP communication network and thereafter connect the another mobile terminal 100b to the Bluetooth speaker 200 through the A2DP.

In order to solve such a problem, the present invention proposes a method of establishing a network as illustrated in FIG. 2B and reproducing files of a plurality of mobile terminals included in the established network through a Bluetooth speaker or the mobile terminals themselves.

More specifically, the present invention may form a network by establishing connection between a host terminal 300 and upload terminals 400 in various ways. For example, the host terminal 300 may form a network with each of the plurality of upload terminals 400 by a Wi-Fi Direct technology. As another example, if there is an access point (AP), the host terminal 300 may form a network through a communication network provided by the AP. This network forming method will be described in more detail with reference to FIGS. 8A and 8B.

That is, according to the present invention, the host terminal may sequentially reproduce files stored in the plurality of upload terminals through a network formed for file sharing between the host terminal and the upload terminals, without forming a separate network. In addition, the host terminal may transmit data related to a reproduction of the files stored in the upload terminals to the Bluetooth speaker 200, which is connected through Bluetooth communication, in an A2DP manner, such that the files stored in the upload terminals can be reproduced through the Bluetooth speaker 200.

Hereinafter, a network between a host terminal and the Bluetooth speaker 200 is referred to as a first network or an external network, and a network formed between the host terminal and an upload terminal to transmit file-related data is referred to as a second network or an internal network.

Hereinafter, the host terminal refers to a terminal that receives a file path on a network for file sharing and transmits the file path to the Bluetooth speaker 200 through the first network, and the upload terminal refers to a terminal that transmits a file path to the host terminal on the network for the file sharing and transmits data related to file reproduction in a streaming manner based on a request (or a message) of the host terminal. These terms may be replaced with other terms or may be easily changed by those skilled in the art.

Figure 3A:
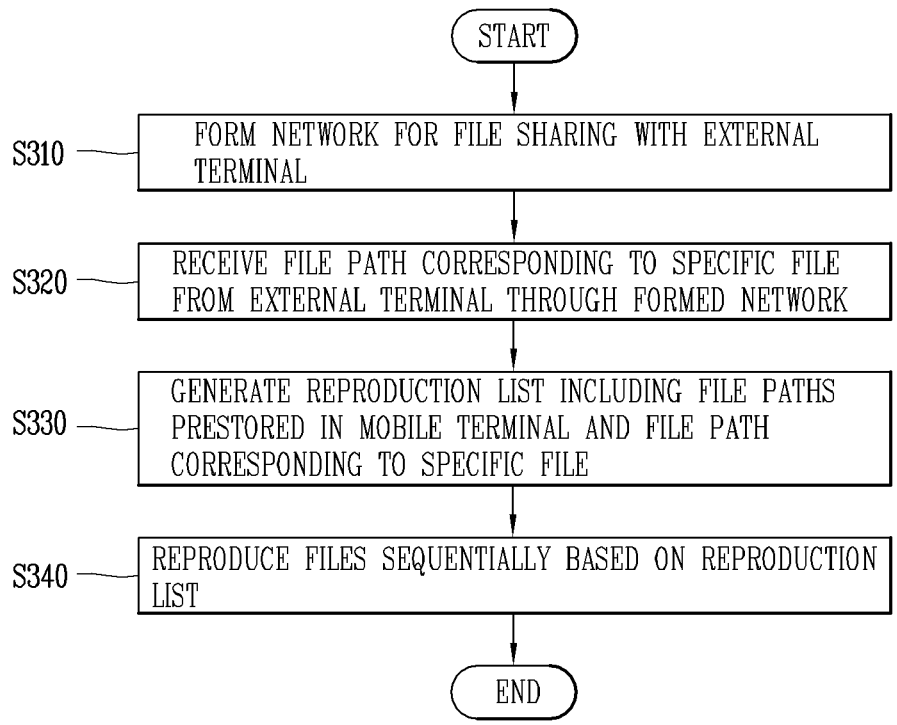
FIGS. 3A, 3B, and 3C are flowcharts illustrating a method of reproducing a file on a network for file sharing formed according to one embodiment of the present invention.
Figure 3B:
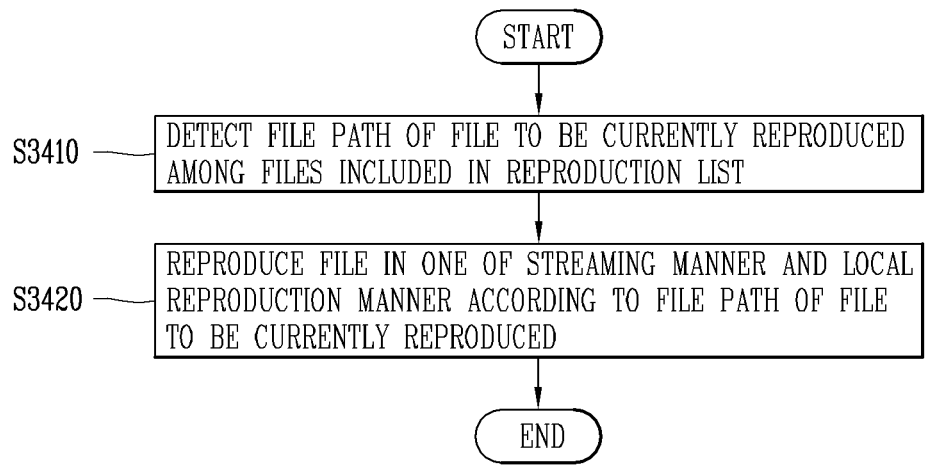
Figure 3C:
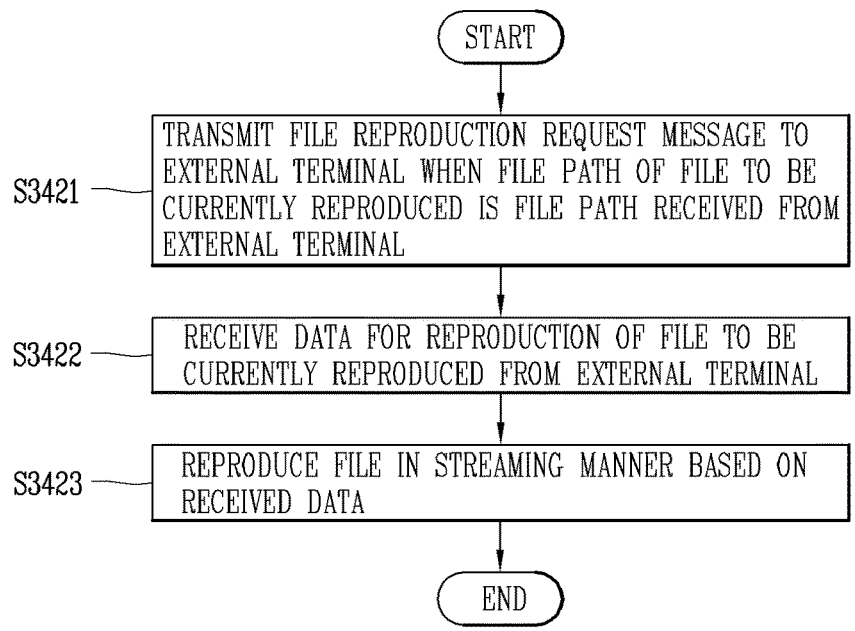
Figure 4:
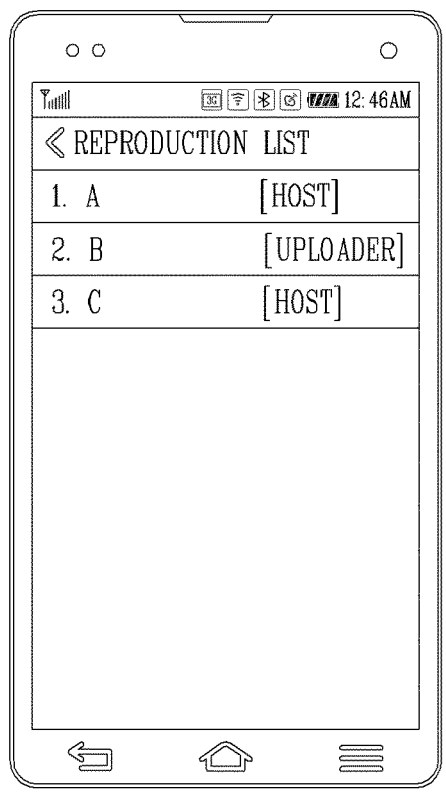
FIG. 4 is a view illustrating a reproduction list according to the present invention.
Figure 5A:
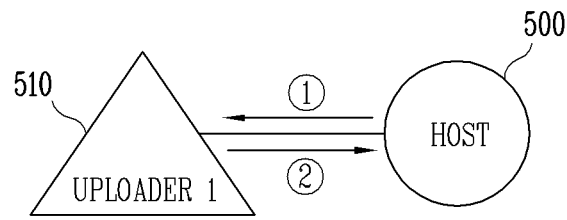
FIG. 5A is a conceptual view illustrating a network configuration of a host terminal 500 and an upload terminal 510.
Figure 5B:
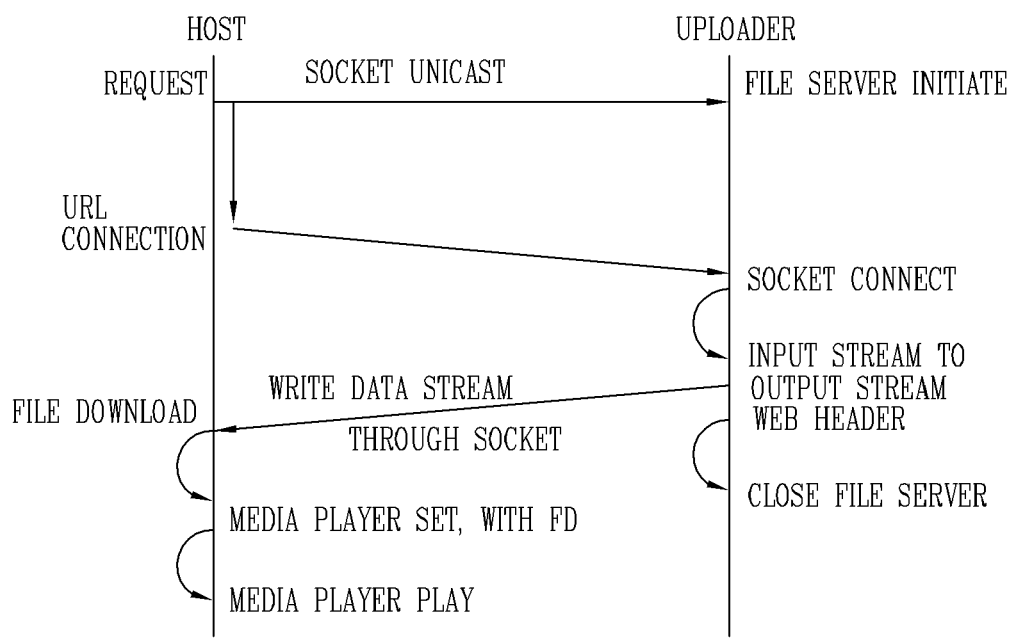
FIG. 5B is a conceptual view illustrating a method of transmitting data for reproducing a file from an upload terminal to a host terminal.

Hereinafter, a method for sequentially reproducing shared files through a file sharing network formed according to one embodiment of the present invention will be described. FIGS. 3A, 3B, and 3C are flowcharts illustrating a method of reproducing a file on a network for file sharing formed according to one embodiment of the present invention. FIG. 4 is a view illustrating a reproduction list according to the present invention. FIG. 5A is a conceptual view illustrating a network configuration of a host terminal 500 and an upload terminal 510. FIG. 5B is a conceptual view illustrating a method of transmitting data for reproducing a file from an upload terminal to a host terminal.

First, the controller 180 of the mobile terminal according to one embodiment of the present invention may form a network for file sharing (or a file sharing network) with an external terminal (S310).

The user of the mobile terminal according to the present invention may execute a file reproduction application pre-installed in the mobile terminal in order to form the file sharing network.

The file reproduction application may also be pre-installed at the time of manufacture of the mobile terminal or may be installed through an application market based on the user's selection.

After the execution of the file reproduction application, the controller 180 may form the file sharing network with at least one external terminal based on a control command input from the user.

In this case, the controller 180 may set the mobile terminal itself as a host terminal and set the at least one external terminal as an upload terminal. Hereinafter, the mobile terminal including the controller 180 is referred to as a host terminal, and the external terminal is referred to as an upload terminal. Also, a group of mobile terminals including a host terminal and an upload terminal is referred to as a file sharing group. The file sharing group will be described in more detail with reference to FIGS. 9A to 9D. In addition, these terms may be readily modified by those skilled in the art with other terms having equivalent meanings.

Here, establishing the network may mean performing a communication connection to enable transmission and reception of data, a control request message, a control command and the like for reproducing a file between a host terminal and an upload terminal. Such a network forming method will be described in more detail with reference to FIGS. 8A and 8B.

At this time, the external terminal set as the upload terminal may be a terminal which can perform short-range communication with the host terminal. Here, the short-range communication is a wireless communication implemented by Wi-Fi Direct, Digital Living Network Alliance (DLNA), Wi-Di technology, and Miracast technology.

When a plurality of external terminals is set as upload terminals in the file sharing group, communication may not be established between the plurality of external terminals. That is, the plurality of external terminals cannot perform communication with each other. In this case, the plurality of external terminals may perform communication through the host terminal. That is, the plurality of external terminals may perform communication using the host terminal as a repeater.

Hereinafter, unless otherwise specified, it is assumed that there is only one upload terminal, but the present invention may also be applied to a case where there is a plurality of upload terminals.

The controller 180 may receive a file path corresponding to a specific file from the upload terminal through the established network (S320).

When the network is formed, the controller 180 may receive the file path corresponding to the specific file from the upload terminal through the established network.

The file path corresponding to the specific file refers to a path in which file-related data has been stored for file reproduction. For example, the file path corresponding to the specific file may be a path in which the specific file has been stored on the upload terminal, a Uniform Resource Identifier (URI) including identification information regarding the upload terminal, a Uniform Resource Locator (URL) as network path information regarding the specific file, and the like.

That is, the upload terminal according to the present invention does not transmit file information itself but transmits only the path in which the file-related data has been stored. Accordingly, the present invention can access the upload terminal and reproduce the specific file at the time of reproducing the file without the need of storing file information in the memory of the host terminal.

The controller 180 may generate a reproduction list including file paths prestored in the memory 170 and a file path corresponding to the specific file received from the upload terminal (S330).

When the file path corresponding to the specific file is received from the upload terminal, the controller 180 may generate a reproduction list including file paths A and C prestored in the memory 170 and the file path B corresponding to the specific file.

The reproduction list may be a list in which file paths corresponding to one or more files are stored in a designated order for reproducing the one or more files. For example, a first file path corresponding to a first file and a second file path corresponding to a second file may be stored in sequence in the reproduction list.

In this case, the controller 180 may sequentially reproduce the file paths corresponding to the one or more files included in the reproduction list, based on a preset reproduction order.

The reproduction order of the files in the reproduction list may be determined based on the user's selection and file-related information. Here, the file-related information may be information related to a genre, a length of a song, a title, a composer, an album name, a forwarder, an alphabet, a transmission order, priority, a theme, and the like. Further, the reproduction order may be changed by the user's request.

The controller 180 may edit the reproduction list based on the user's request or a request (or message) received from the upload terminal. Here, editing of the reproduction list includes changing a reproduction order, deleting a file, adding a file, pausing a reproduction, stopping a reproduction, changing a reproduction style, and the like. Here, the user's request may be input from the user of the host terminal to the host terminal or may be input from a user of the upload terminal to the upload terminal to be transmitted from the upload terminal to the host terminal.

More specifically, the controller 180 may set a reproduction order of the file paths corresponding to the one or more files included in the reproduction list, based on the user's request or the request (or message) received from the upload terminal. For example, when a user request for reproducing files in the order of a first file and a second file is received, the controller 180 may set a reproduction order such that a first file path corresponding to the first file and a second file path corresponding to the second file are played sequentially. Here, the user request may be input from the user of the host terminal to the host terminal or may be input from a user of the upload terminal to the upload terminal to be transmitted from the upload terminal to the host terminal.

In addition, the controller 180 may delete a file path corresponding to at least one file included in the reproduction list or add a new file path, based on a user request or a request (or message) received from the upload terminal. For example, the controller 180 may delete a first file path corresponding to a first file included in the reproduction list from the reproduction list, in response to a control command to delete the first file path being received from the upload terminal. As another example, the controller 180 may add a third file path corresponding to a third file, which is not included in the reproduction list, to the reproduction list when the third file path corresponding to the third file is received from the upload terminal. In this case, the reproduction order of the third file path may be set in a manner that the third file path can be reproduced the last among the files included in the reproduction list.

In addition, the controller 180 may control the reproduction of a currently-reproduced file among the file paths included in the reproduction list, based on a user request or a request (or message) received from the upload terminal.

For example, when a first file is being reproduced, the controller 180 may pause or stop the reproduction of the first file based on a user request or a request (or a message) received from the upload terminal.

In addition, the controller 180 may set an audio effect based on a control command received from the upload terminal. Here, the audio effect is an audio output effect during a file reproduction, and examples of the audio effect include a volume adjustment, an equalizer, mixing, and the like. For example, the controller 180 may increase a reproduction volume based on a reception of a control command for increasing a volume.

The controller 180 may sequentially reproduce the files based on the generated reproduction list (S340).

The controller 180 may reproduce the files through an output unit (e.g., a speaker, a display unit, etc.) provided in the mobile terminal itself or through the Bluetooth speaker 200 connected.

The controller 180 may sequentially reproduce the files according to the order of the one or more file paths included in the generated reproduction list. That is, the controller 180 may access the one or more file paths and reproduce the files according to the order set in the reproduction list.

At this time, the controller 180 may reproduce the files in different ways according to stored locations of the files corresponding to the file paths. That is, the controller 180 may reproduce files stored in the mobile terminal and files stored in the upload terminal in different ways.

More specifically, referring to FIG. 3B, the controller 180 may detect a file path of a file to be currently reproduced from the files included in the generated reproduction list (S3410).

Thereafter, the controller 180 may reproduce the files in different ways according to the file path of the file to be currently reproduced. More specifically, the controller 180 may reproduce the files in one of a streaming manner and a local reproduction manner (S3420).

Here, the streaming manner refers to a method of receiving data related to a file reproduction in real time through communication, without storing the file in the memory 170, and reproducing the received data in real time. In addition, the local reproduction manner is a general reproduction method of loading a file stored in the memory 170 and reproducing the loaded file.

When a file to be currently reproduced is a file whose file path is received from the upload terminal, the controller 180 may access the upload terminal through the established network based on the file path received from the upload terminal and reproduce the file corresponding to the received file path in the streaming manner.

In more detail, referring to FIG. 3C, when the file to be currently reproduced is a file whose file path is received from the upload terminal, the controller 180 may transmit a file reproduction request (or a file reproduction request message) for reproducing the file to be currently reproduced to the upload terminal (S3421).

As illustrated in FIG. 5A, the present invention may configure a network by a host terminal 500 and an upload terminal 510.

At this time, the controller 180 of the host terminal 500 may transmit a file reproduction request ① to the upload terminal 510 based on identification information (or an IP address) related to the upload terminal 510 in the file path received from the upload terminal 510.

In response to the file reproduction request, the upload terminal 510 may transmit data ② for reproducing the file to be currently reproduced to the host terminal 500. To this end, the upload terminal 510 waits for a communication establishment for transmission of the file to be currently reproduced, in order to transmit the file to be currently reproduced in the streaming manner. Thereafter, the upload terminal 510 may connect a socket when receiving a request to receive data for reproducing the file to be currently reproduced in an HTTP communication manner.

The controller 180 may receive the data for reproducing the file to be currently reproduced from the upload terminal 510 (S3422). The host terminal 500 and the upload terminal 510 may transmit and receive the data for reproducing the file to be currently reproduced through a network formed by the socket.

As illustrated in FIG. 5B, the upload terminal may transmit the data for reproducing the file to be currently reproduced to the host terminal, in real time, by a specific amount, instead of transmitting the entire file itself to be reproduced.

More specifically, the upload terminal transmits data for the host terminal to reproduce the file in a hypertext transfer protocol (HTTP) communication manner using a web header before using socket data. The HTTP communication manner is a communication protocol for transmitting a document through communication and is a commonly known communication method. Thus, a detailed description thereof will be omitted in this specification.

The controller 180 may reproduce the file to be currently reproduced in the streaming manner based on the received data (S3423).

The controller 180 may reproduce the file in the streaming manner based on received data for file reproduction when the data for the file reproduction is received by the HTTP communication method. At this time, the controller 180 may perform the file reproduction through the output unit provided in the mobile terminal or through the Bluetooth speaker 200 connected to the controller 180 to perform communication. Accordingly, the present invention can conveniently reproduce the files stored in the upload terminal regardless of a memory capacity of the host terminal.

Also, the controller 180 may reproduce the file through the Bluetooth speaker 200 connected through Bluetooth communication, even without forming a separate network for each upload terminal having the file to be currently reproduced stored therein, when the file is reproduced. Accordingly, the present invention can solve inconvenience of performing separate communication establishment for each upload terminal.

On the other hand, when the file to be currently reproduced is a file path prestored in the mobile terminal, the controller 180 may reproduce the file in the local reproduction manner, in which the file is reproduced by being loaded from the memory 170, based on the file path prestored in the mobile terminal. Even in this case, the controller 180 may reproduce the file through the output unit provided in the mobile terminal or the Bluetooth speaker 200.

When the reproduction of a currently-reproduced file is completed, the controller 180 may reproduce a file of the next order. In this case, the controller 180 may reproduce the file of the next order by accessing the memory 170 of the host terminal or the upload terminal again according to a position of the file to be currently reproduced.

At this time, the controller 180 may output identification information regarding an external terminal, in which the file of the next order is stored, and information related to the file of the next order when reproducing the file of the next order. For example, the controller 180 may first output a voice "Music uploaded by James" before the reproduction of the file of the next order. Thus, more various music files can be reproduced for the user.

On the other hand, the upload terminal may receive the reproduction list from the host terminal in response to a request of the upload terminal itself or in real time. The upload terminal may reproduce the files included in the reproduction list. A detailed control method thereof will be described with reference to FIG. 7.

The foregoing description has been given of the case where there is one upload terminal, but the present invention may be similarly applied to a case where there is a plurality of upload terminals.

More specifically, the controller 180 may form a network in which a first external terminal and a second external terminal are set as upload terminals. Thereafter, the controller 180 may receive a first file path corresponding to a first file from the first upload terminal and a second file path corresponding to a second file from the second upload terminal.

In addition, the controller 180 may generate a reproduction list including the received first and second file paths and file path stored in the memory of the mobile terminal.

When a file to be currently reproduced is the first file corresponding to the first file path among the files included in the reproduction list, the controller may access the first external terminal through the established network based on the first file path to reproduce the first file in the streaming manner.

In addition, when the reproduction list is generated such that the second file is reproduced after the reproduction of the first file, the controller 180 may access the second external terminal through the established network based on the second file path corresponding to the second file to reproduce the second file in the streaming manner.

That is, the controller 180 may perform file reproduction by sequentially accessing the first upload terminal and the second upload terminal based on the reproduction list, even without a separate user request.

The foregoing description has been given of the method of conveniently reproducing the files stored in the host terminal and the upload terminal through the reproduction list.

Figure 6:
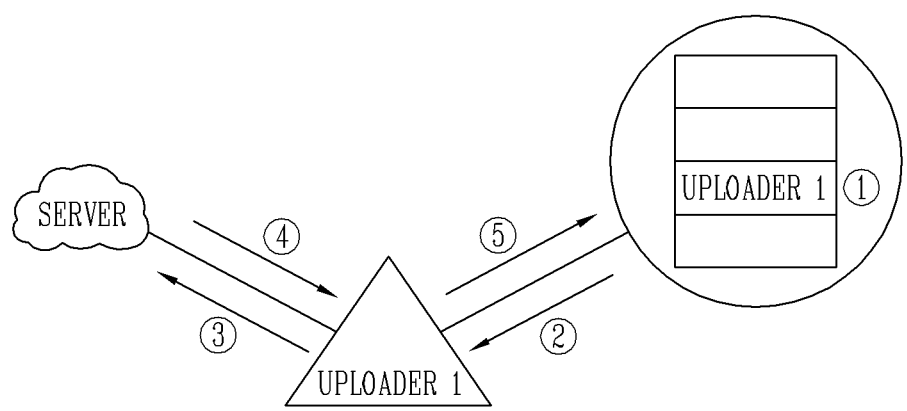
FIG. 6 is a conceptual view illustrating a data flow for accessing and reproducing files stored in a content server or a service provider through an upload terminal.

Hereinafter, a method of accessing and reproducing files stored in a content server or a service provider through an upload terminal will be described. FIG. 6 is a conceptual view illustrating a data flow for accessing and reproducing files stored in a content server or a service provider through an upload terminal.

The controller 180 may generate a reproduction list using file paths received from the host terminal and the upload terminal included in the aforementioned network. Thereafter, the controller 180 may sequentially reproduce one or more file paths included in the reproduction list.

The one or more file paths are storage paths in which the files are stored. For example, the one or more file paths may be a storage path stored in the memory of the host terminal, a storage path stored in the memory of the upload terminal and a storage path stored in a web server.

When a file to be currently reproduced is a file corresponding to a file path received from the upload terminal, the controller 180 may access the upload terminal based on the file path.

As illustrated in FIG. 6, when the file to be currently reproduced is a file ① corresponding to a file path received from the upload terminal, the controller 180 may transmit a file reproduction request to the upload terminal through the network formed between the host terminal and the upload terminal.

On the other hand, the upload terminal may access a target file with respect to the file reproduction request when the file reproduction request ② is received. When the target file is a file stored in the memory, the upload terminal may load the target file from the memory and transmit the loaded target file to the host terminal.

However, when the target file is a file stored in a content server or a service provider, the controller of the upload terminal may load the file by accessing the content server or the service provider through communication based on the Wi-Fi technology or the LTE communication technology.

More specifically, as illustrated in FIG. 6, when the target file is a file stored in the content server or the service provider, the upload terminal may transmit a data request message ③ for reproducing the file to the content server or the service provider through communication based on the Wi-Fi technology or the LTE communication technology.

In response to the data request message ③, the content server or the service provider may transmit file reproduction data ④ to the upload terminal. Thereafter, the upload terminal may transmit the file reproduction data ⑤ to the host terminal. Accordingly, the host terminal may reproduce the files stored in the content server or the service provider in the streaming manner.

The foregoing description has been given of the method of accessing and reproducing the files stored in the content server or the service provider through the upload terminal.

Figure 7:
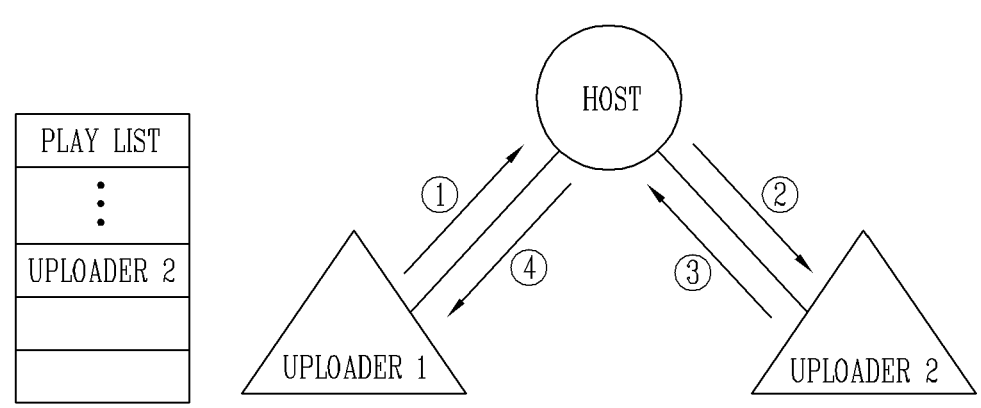
FIG. 7 is a conceptual view illustrating a method of reproducing a file between a plurality of upload terminals through a host terminal when the plurality of upload terminals is included in a network for file sharing.

Hereinafter, description will be given of a method of reproducing files between a plurality of upload terminals through a host terminal when the plurality of upload terminals is included in a network for file sharing. FIG. 7 is a conceptual view illustrating a method of reproducing a file between a plurality of upload terminals through a host terminal when the plurality of upload terminals is included in a network for file sharing.

The network for the file sharing may include a plurality of upload terminals. As illustrated in FIG. 7, the network for the file sharing may include one host terminal, a first upload terminal, and a second upload terminal.

At this time, the first upload terminal and the second upload terminal may share a reproduction list of the host terminal. The sharing of the reproduction list may refer to a state in which each upload terminal sharing the reproduction list can perform reproduction, separately from the file reproduction of the host terminal. For example, the first upload terminal may reproduce a first file included in the reproduction list.

That is, according to the present invention, the first upload terminal and the second upload terminal included in the network may individually access the files included in the reproduction list.

Meanwhile, the first upload terminal may not perform communication with the second upload terminal through the established network. Accordingly, the first upload terminal may reproduce a file by accessing the file stored in the second upload terminal through the host terminal.

To this end, the first upload terminal may receive from the user a reproduction request for a second file stored in the second upload terminal among the files included in the reproduction list.

In this case, referring to FIG. 7, the first upload terminal may transmit a reproduction request ① for the second file to the host terminal through the network.

The controller 180 of the host terminal may transmit a data request message ② for reproducing the second file to the second upload terminal when the reproduction request ① for the second file is received from the first upload terminal.

The second upload terminal may transmit data ③ for reproduction of the second file to the host terminal, in response to the data request message ② for reproducing the second file. At this time, the data for reproducing the second file may be transmitted according to the HTTP communication method, as described above.

The host terminal may transmit the data ④ for reproducing the second file to the first upload terminal when the data for reproducing the second file is received from the second upload terminal. At this time, the data for reproducing the second file may also be transmitted according to the HTTP communication method, as described above.

The first upload terminal may reproduce the second file based on the data for reproducing the second file. Accordingly, even the upload terminal as well as the host terminal can reproduce the files using the reproduction list.

Figure 8A:
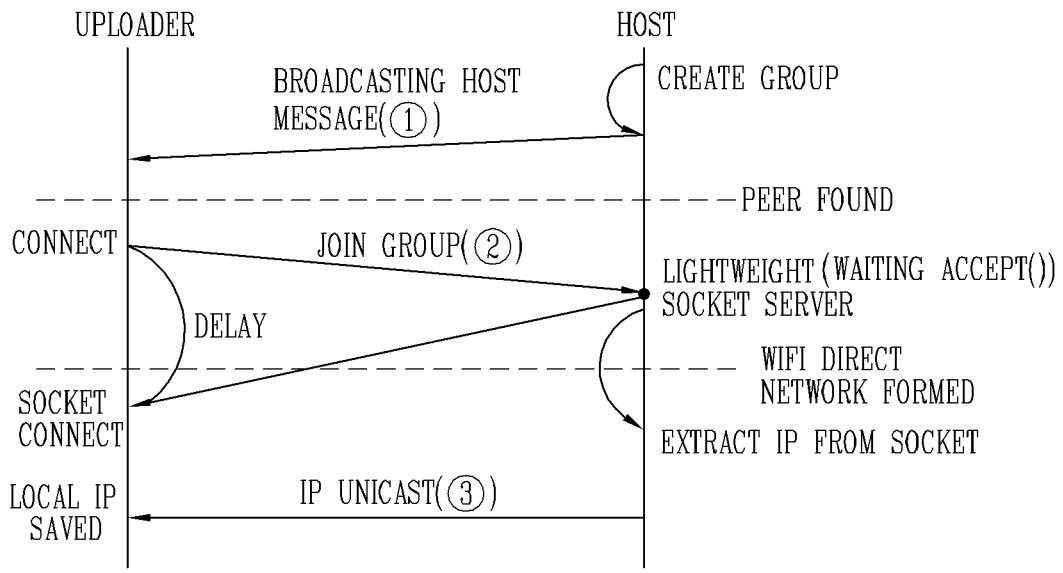
FIG. 8A is a flowchart illustrating a method of establishing a network without using an AP.
Figure 8B:
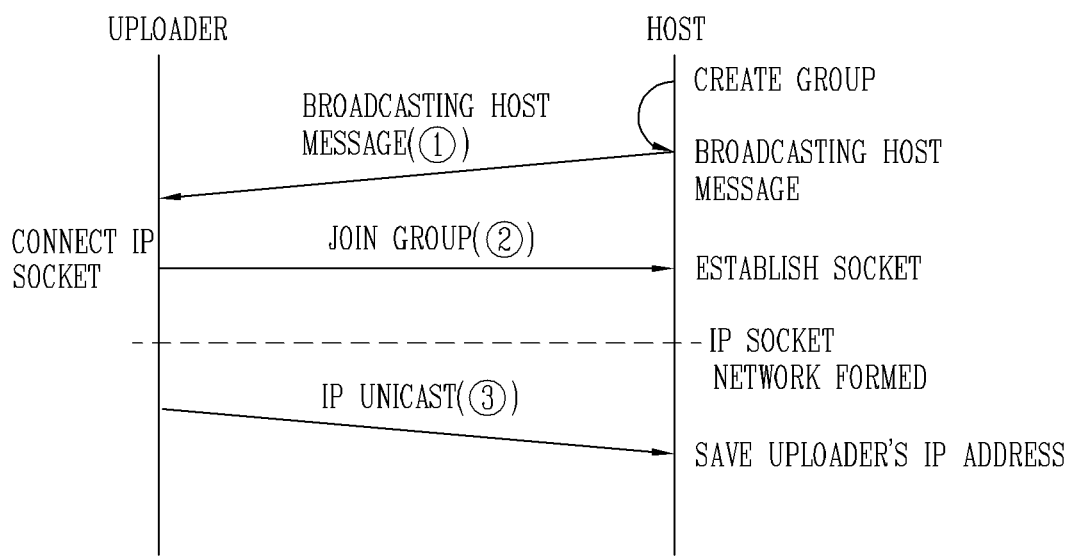
FIG. 8B is a flowchart illustrating a method of establishing a network using an AP.

Hereinafter, a method in which a host terminal establishes a network with an upload terminal according to the present invention will be described. FIG. 8A is a flowchart illustrating a method of establishing a network without using an access point (AP), and FIG. 8B is a flowchart illustrating a method of establishing a network using an AP.

A host terminal according to the present invention may form a network constructed by at least one external terminal based on a user request. At this time, the host terminal may form a network in a different manner depending on presence or absence of an AP.

First, when there is no AP, the host terminal may perform an operation for detecting an IP address of an external terminal for establishing a network.

More specifically, as illustrated in FIG. 8A, the controller 180 of the host terminal may generate a file sharing group. The controller 180 may set itself as a host terminal of the file sharing group. In order to induce the network establishment, the controller 180 may broadcast a message ① indicating that it is the host terminal (i.e., a host message) to reach an external terminal located within a range preset based on the host terminal. This message may also be referred to as a Discover Peer message. The host message may include identification information (an IP address) related to the host terminal.

At this time, the external terminal located within the preset range may receive the host message. Thereafter, the controller of the external terminal may access (or join) ② a lightweight socket server of the host terminal in response to the host message ①. Here, a socket is a software data path for transmitting and receiving data between two mobile terminals or between a mobile terminal and a server. The lightweight socket server is a server which is provided by the host terminal to generate a socket.

The controller 180 of the host terminal may generate a socket to perform Wi-Fi Direct communication with the external terminal accessed to the lightweight socket server and form a network through the generated socket. The controller 180 of the host terminal may detect an IP address ③ of the external terminal in the generated socket and transmit the IP address to the external terminal.

Also, the host terminal may set the external terminal as an upload terminal.

The external terminal may store the IP address, identification information related to the host terminal and its own identification information in a memory. Accordingly, the external terminal and the host terminal can transmit and receive data based on their IP addresses.

On the other hand, when an AP exists, since each terminal is assigned an IP address, the host terminal may form a network without performing the detection of the IP address of the external terminal.

Referring to FIG. 8B, the controller 180 of the host terminal may broadcast a message ① indicating that it is the host terminal (i.e., a host message), in order to induce a network establishment (formation). The host message may be a User Datagram Protocol (UDP) message. The UDP message is a message defined in "User Datagram Protocol" as a TCP/IP standard. The UDP message may be used when transmitting data quickly and simply although it is unreliable.

When the UDP message is received, the external terminal may transmit an access request to access ② a socket of the host terminal. At this time, the host terminal may establish a socket based on the access request received from the external terminal. In this case, the external terminal may access the established socket.

The external terminal may transmit its own IP address to the host terminal when it accesses the established socket. At this time, the external terminal may transmit its IP address in the form of unicast, which is one-to-one communication with the host terminal.

The host terminal may store the IP address of the external terminal and set the external terminal as an upload terminal. Accordingly, the host terminal can establish a network with the external terminal.

On the other hand, when the external terminal is set as the upload terminal, the external terminal may transmit its IP address and a file path of a file, which is to be transmitted to the host terminal, to the host terminal at once. That is, the upload terminal transmits information, in which its IP address and the file path to be transmitted to the host terminal are combined with each other, as URI type information.

The foregoing description has been given of the method of establishing the network for file sharing between the host terminal and the upload terminal according to the present invention.

Hereinafter, a method of controlling a file sharing group between a host terminal and an upload terminal according to the present invention will be described. FIGS. 9A to 9D are conceptual views illustrating a method of controlling a file sharing group between a host terminal and an upload terminal according to the present invention.

A mobile terminal according to the present invention may generate a file sharing group for performing communication with at least one external terminal for reproducing files stored in the at least one external terminal. At this time, the terminal that has generated the file sharing group may be set as a host terminal of the file sharing group.

After generating the file sharing group, the controller 180 may establish the network as illustrated in FIGS. 8A and 8B, in order to include the upload terminal in the file sharing group.

The file sharing group may include a host terminal and an upload terminal. Also, the file sharing group may include mobile terminals included in the established network.

The host terminal may be only one in one file sharing group. The host terminal may receive at least one file path from a plurality of upload terminals included in the file sharing group and generate a reproduction list including files stored in the memory of the host terminal and the received at least one file path.

The host terminal may reproduce the files in the order set in the reproduction list based on the reproduction list. Description of the method of reproducing the files is replaced with the description of FIG. 3.

The upload terminal may transmit a file path corresponding to at least one file to the host terminal through the network. The file path corresponding to the at least one file may be selected by a user's control command among the plurality of files stored in the memory of the upload terminal.

The upload terminal may have a different control authority from the host terminal. More specifically, the host terminal can perform all control related to the file sharing group, but the upload terminal may be restricted from performing a control of excluding the host terminal from the file sharing group or arbitrarily changing the host terminal. However, it is apparent to those skilled in the art that the upload terminal can also have the same control authority as the host terminal according to the user's setting.

Figure 9A:
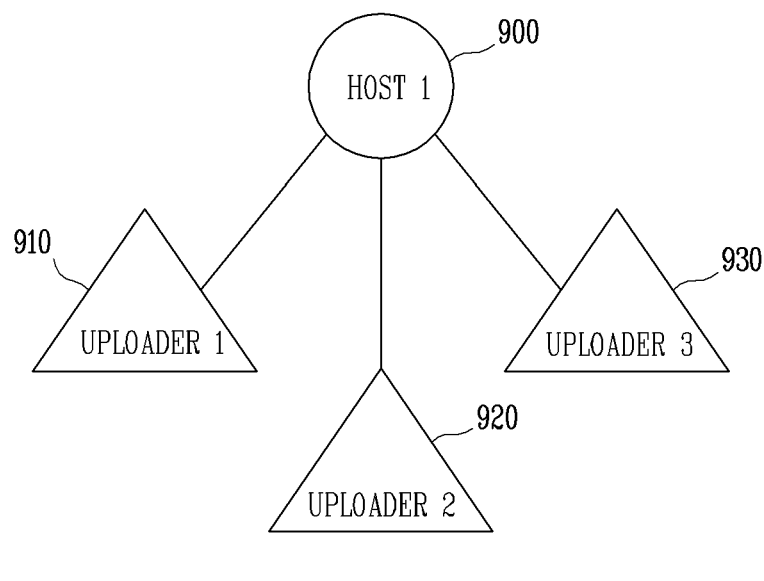
FIGS. 9A to 9D are conceptual views illustrating a method of controlling a file sharing group between a host terminal and an upload terminal according to the present invention.
Figure 9A:
Figure 9A:
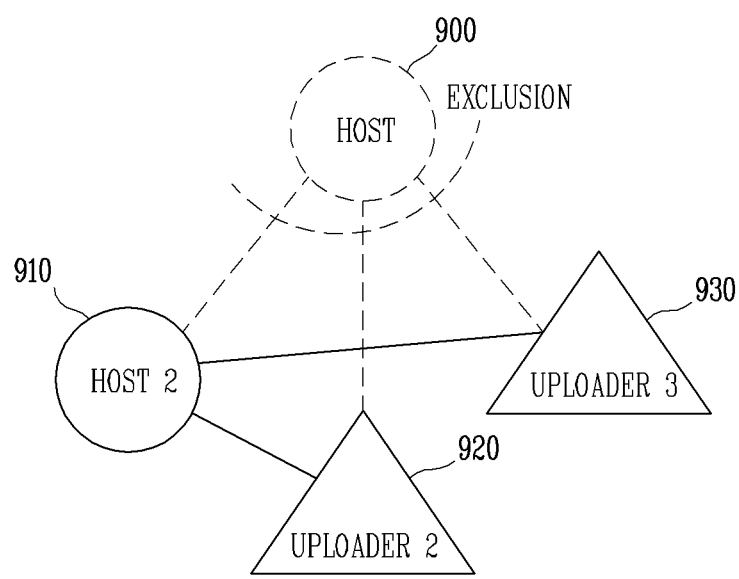

On the other hand, the host terminal of the file sharing group may be changed by a user request. For example, as illustrated in FIG. 9A, when a file sharing group is constructed by a host terminal 900 and first, second and third upload terminals 910, 920 and 930, the controller 180 of the host terminal 900 may change the host terminal to the first upload terminal 910 based on a user request.

To this end, when receiving a user request for changing the host terminal, the controller 180 of the host terminal 900 may transmit an upload terminal list including identification information related to the upload terminals 920 and 930 and information related to the file sharing group (e.g., a reproduction list and a reproduction state of a file, etc.) to a candidate host terminal 910. Here, the candidate host terminal 910 may be selected by the user or set according to a predetermined priority. For example, the candidate host terminal may be the first upload terminal 910.

In addition, the controller 180 of the host terminal 900 may set the candidate host terminal 910 as a host terminal.

When the candidate host terminal 910 receives the upload terminal list including the identification information related to the upload terminals 920 and 930 and the information related to the file sharing group, the candidate host terminal 910 may broadcast the change of the host terminal to the upload terminals included in the upload terminal list. That is, the candidate host terminal 910 may broadcast to the upload terminals 920 and 930 that a new network has been established. In this way, the upload terminals 920 and 930 may know the identification information related to the new host terminal 910 and its IP address and perform communication with the new host terminal through the new network.

In addition, the new host terminal 910 may reproduce the files based on the reproduction list so that the file reproduction is not terminated. Therefore, the present invention does not have to stop the file reproduction even if the host terminal is changed.

On the other hand, after the host terminal is changed, the existing host terminal 900 may be excluded from the file sharing group or changed to the upload terminal.

As illustrated in FIG. 9A, when the existing host terminal 900 is excluded from the file sharing group, the existing host terminal 900 is excluded from the newly-established network and thereby cannot perform communication with the new host terminal. In this case, file paths corresponding to files stored in the existing host terminal 900 may be deleted from the reproduction list. Accordingly, the new host terminal cannot reproduce the files stored in the existing host terminal 900.

Figure 9B:
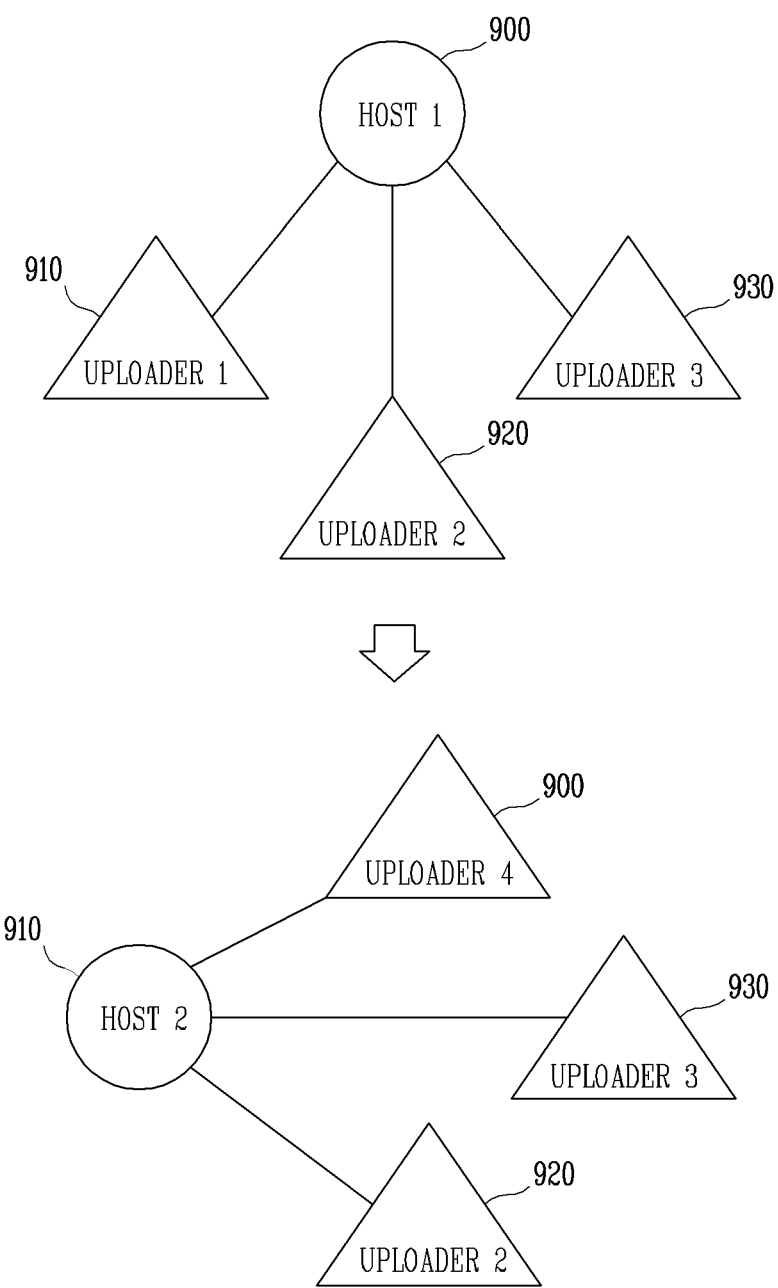

As illustrated in FIG. 9B, when the host terminal is changed from the existing host terminal 900 to the fourth upload terminal in the file sharing group, the existing host terminal 900 may become a host terminal so as to transmit and receive file paths and control messages with the new host terminal through the new network. For example, the existing host terminal 900 may transmit a file path corresponding to at least one file to the new host terminal 910.

In this case, when the host terminal is reset from the existing host terminal 900 to the upload terminal, it may be understood that the authority of the host terminal has handed over to the upload terminal.

Accordingly, the present invention can seamlessly perform the handover of the host terminal by setting another upload terminal to the host terminal even if the host terminal is changed.

Figure 9C:
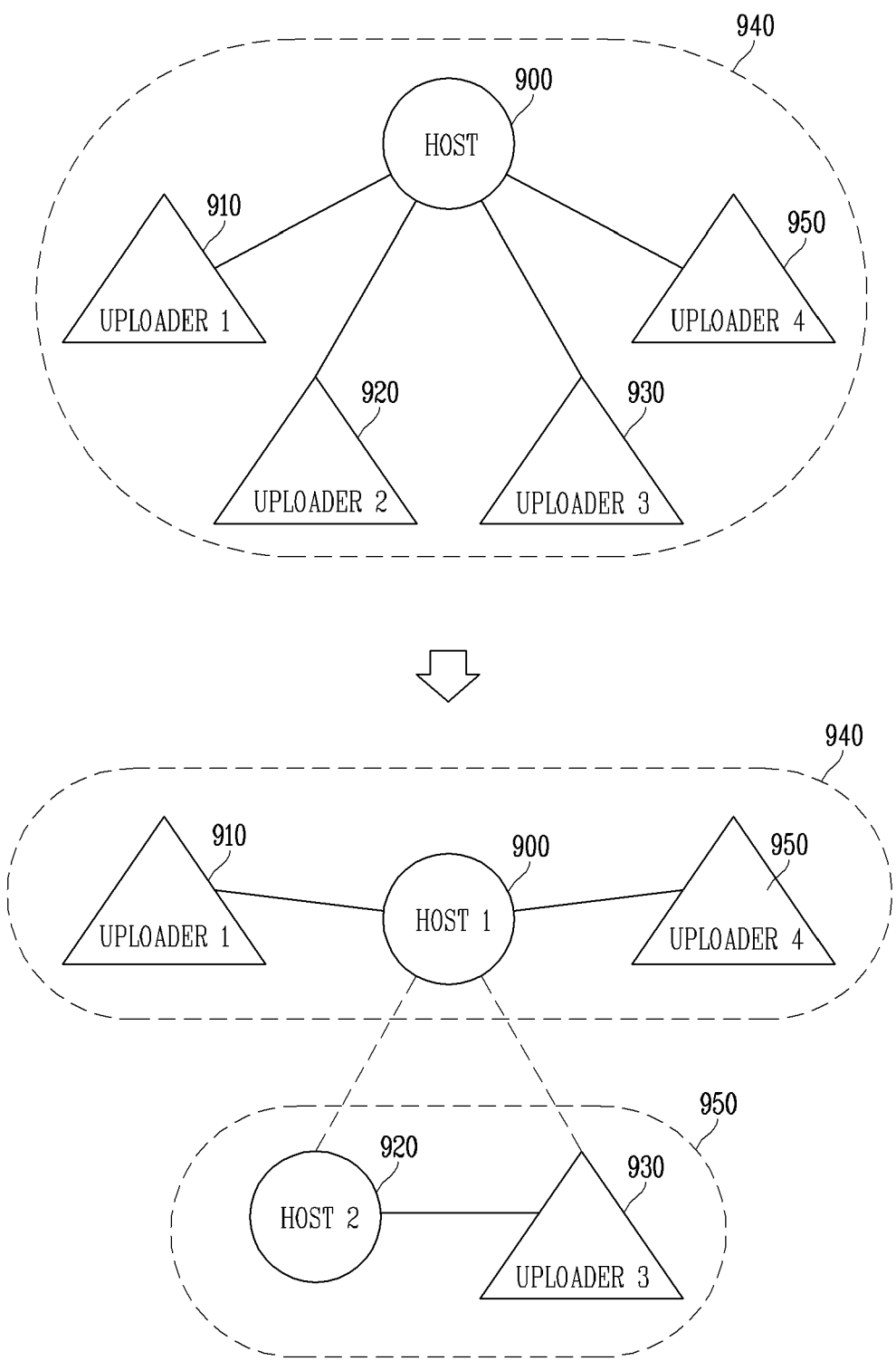

Meanwhile, as illustrated in FIG. 9C, the controller 900 of the host terminal of the file sharing group may establish a new network including some upload terminals among at least one upload terminal included in the file sharing group.

In more detail, as illustrated in FIG. 9C, when a first file sharing group 940 is constructed by a host terminal 900 and first, second, third and fourth upload terminals 910, 920, 930 and 950, the controller 180 of the host terminal may generate a second file sharing group 950 constructed by the second and third upload terminals 920 and 930.

To this end, the controller 180 of the host terminal, which constitutes the first file sharing group, may set the second upload terminal 920 to a candidate host terminal of the second file sharing group among the first to fourth upload terminals 910, 920, 930 and 950, in response to a reception of a new network establishment request.

Then, the host terminal 900 may transmit a candidate host setup request message to the second upload terminal 920. The second upload terminal 920 may transmit its identification information (e.g., a Mac address) to the host terminal 900.

The controller 180 of the host terminal may generate a sorting list including identification information related to upload terminals to be sorted into the second file sharing group. Then, the controller 180 may transmit the sorting list to the second upload terminal 910. The second upload terminal 910 may wait for a communication connection request of the upload terminal to establish a new network after receiving the sorting list.

The controller 180 may transmit a message, which indicates that the second upload terminal 920 has been set as the host terminal, and the identification information related to the second upload terminal 920 to the fourth upload terminal 950 which is to be set to the upload terminal of the second file sharing group. In this case, the fourth upload terminal 950 may perform a communication connection with the second upload terminal 920. Description of this communication connection will be replaced with the description of FIGS. 8A and 8B.

Accordingly, the second upload terminal 920 can create the second file sharing group in which it has been set to the host terminal. In addition, the second upload terminal 920 may establish a network for performing communication with the fourth upload terminal 950.

The second upload terminal 920 and the fourth upload terminal 950 may be excluded from the first file sharing group. In this case, the host terminal 900 may delete file paths of files stored in the second and fourth upload terminals 920 and 950 from the reproduction list.

In addition, the second upload terminal 920, which is the host terminal of the second file sharing group, may generate a new reproduction list based on file paths of files stored in its memory and file paths received from the fourth upload terminal 950.

Figure 9D:
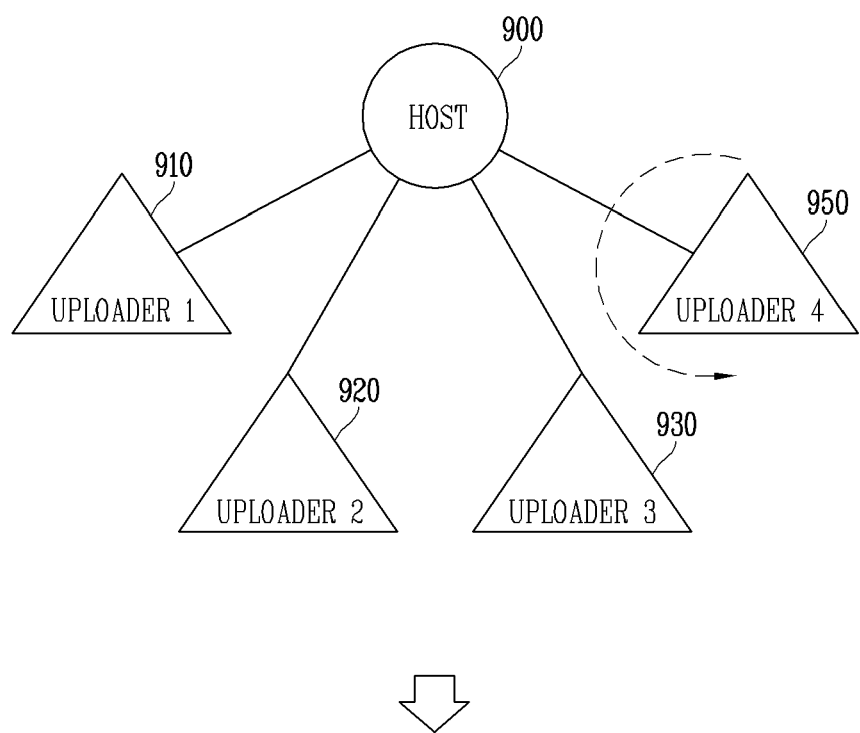
Figure 9D:
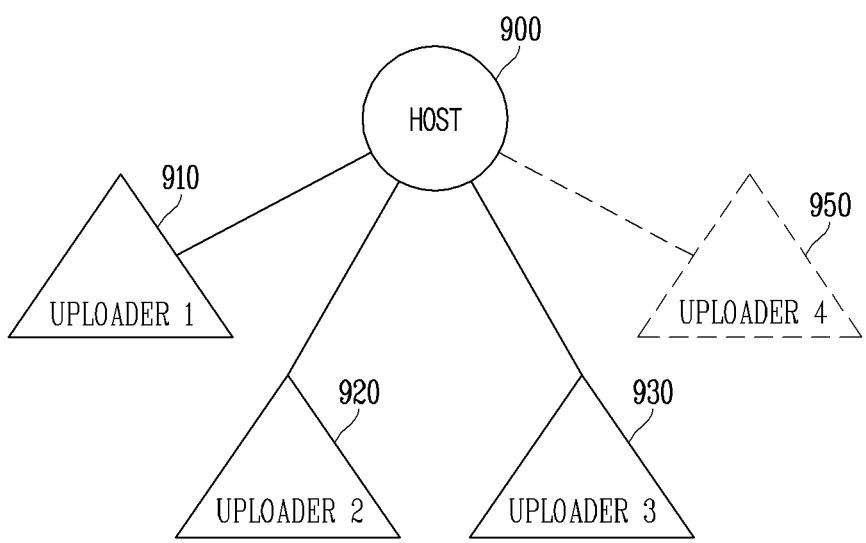

On the other hand, as illustrated in FIG. 9D, the controller 180 of the host terminal may exclude the fourth upload terminal 950 of the first, second, third, and fourth upload terminals 910, 920, 930, and 950 from the file sharing group.

In this case, since the fourth upload terminal 950 is excluded from the network, the fourth upload terminal 950 cannot perform communication with the host terminal 900 any more. Also, the controller 180 may delete the file paths corresponding to the files stored in the fourth upload terminal included in the reproduction list from the reproduction list.

So far, the method of setting the file sharing group has been described.

The present invention can share file paths of files stored in each mobile terminal by establishing a network between the mobile terminals such that files stored in one terminal can be reproduced in another mobile terminal in a streaming manner. Thus, the present invention can minimize a memory usage when reproducing a file stored in an external terminal.

In addition, the present invention can generate a reproduction list using file paths received from mobile terminals included in a network, and sequentially reproduce files according to the generated reproduction list. Accordingly, the present invention can reproduce files through a preset network, even without creating a separate network in order to reproduce the files.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. A mobile terminal for executing a file reproduction function, the terminal comprising:
   a wireless communication unit to perform communication with an external terminal; and
   a controller to establish a network for file sharing with the external terminal, receive a file path corresponding to a specific file from the external terminal to reproduce the file by accessing the external terminal through the established network, and generate a reproduction list including file paths prestored in the mobile terminal and the file path received from the external terminal,
   wherein the controller, when a file to be currently reproduced is a file corresponding to the file path received from the external terminal among files included in the reproduction list, reproduces the file corresponding to the received file path in a streaming manner by accessing the external terminal through the established network based on the received file path, and
   wherein the controller reproduces the file in a local reproduction manner based on a file path prestored in the mobile terminal when the file to be currently reproduced is the file path prestored in the mobile terminal among the files included in the reproduction list.

2. The terminal of claim 1, wherein the controller transmits a reproduction request to the external terminal based on the file path received from the external terminal, and
   wherein the controller receives data for reproducing the file to be currently reproduced from the external terminal after the transmission of the reproduction request, and reproduces the file in the streaming manner.

3. The terminal of claim 1, wherein the controller edits the reproduction list based on an edit command of the reproduction list when the edit command of the reproduction list is received from the external terminal.

4. The terminal of claim 3, wherein the editing of the reproduction list includes changing a reproduction order, deleting a file included in the reproduction list, adding a file included in the reproduction list, pausing a reproduction and stopping a reproduction.

5. The terminal of claim 1, wherein the external terminal, when a file corresponding to a file path transmitted to the mobile terminal is a file stored in an external server, receives data for reproducing the file from the external server when a file reproduction request is received from the mobile terminal, and transmits the received data to the mobile terminal.

6. The terminal of claim 1, wherein the controller transmits the reproduction list to the external terminal so that the files included in the reproduction list are available in the external terminal.

7. The terminal of claim 1, wherein the established network includes a first external terminal and a second external terminal,
wherein the controller generates a file sharing group including the first external terminal and the second external terminal,
receives a first file path corresponding to a first file from the first external terminal and a second file path corresponding to a second file from the second external terminal through the established network, and
generates a reproduction list including the received first and second file paths.

8. The terminal of claim 7, wherein the controller reproduces the first file in the streaming manner by accessing the first external terminal through the established network based on the first file path when the file to be currently reproduced among the files included in the reproduction list is the first file corresponding to the first file path, and
reproduces the second file in the streaming manner by accessing the second external terminal through the established network based on the second file path when the file to be currently reproduced among the files included in the reproduction list is the second file corresponding to the second file path.

9. The terminal of claim 7, wherein the controller transmits a reproduction request for the second file to the second external terminal when the reproduction request for the second file is received from the first external terminal, and
transmits data for reproducing the second file to the first external terminal when the data for reproducing the second file is received from the second external terminal after the transmission of the reproduction request.

10. The terminal of claim 7, wherein the controller reproduces the file in the mobile terminal using an equalizer function or a preset function of the first external terminal when the file to be currently reproduced among the files included in the reproduction list is the file of the first external terminal.

11. The terminal of claim 7, wherein the controller deletes the second file from the reproduction list when a deletion request for the second file included in the reproduction list is received from the first external terminal.

12. The terminal of claim 7, wherein the controller, when the first external terminal of the first and second external terminals is set to a host terminal in a state where the host terminal of the file sharing group has been set to the mobile terminal, transmits information related to the second external terminal to the first external terminal to establish a new network in which the first external terminal is set to the host terminal.

13. The terminal of claim 12, wherein the mobile terminal is excluded from the newly-established network when the new network is established.

14. The terminal of claim 13, wherein a file path related to the mobile terminal is excluded from the reproduction list included in the first external terminal when the mobile terminal is excluded from the newly-established network.

15. The terminal of claim 12, wherein the controller transmits a file path for generating a reproduction list to the first external terminal set to the host terminal through the newly-established network.

16. The terminal of claim 12, wherein the first external terminal establishes a new network based on a reception of a network establishment request for file sharing from the second external terminal.

17. A file reproduction method of a mobile terminal executing a file reproduction function, the method comprising:
establishing a network for file sharing with an external terminal;
receiving in the mobile terminal a file path corresponding to a specific file from the external terminal to reproduce the file by accessing the external terminal through the established network;
generating a reproduction list including file paths prestored in the mobile terminal and the file path received from the external terminal; and
reproducing in a streaming manner a file corresponding to the received file path by accessing the external terminal through the established network based on the received file path when a file to be currently reproduced is the file corresponding to the file path received from the external terminal among files included in the generated reproduction list, and reproducing the file in a local reproduction manner based on a file path prestored in the mobile terminal when the file to be currently reproduced is the file path prestored in the mobile terminal among the files included in the reproduction list.

18. The method of claim 17, wherein the reproducing the file 10 comprises:
transmitting a file reproduction request to the external terminal based on the file path received from the external terminal; and
reproducing the file in the streaming manner by receiving data for the file reproduction from the external terminal after the transmission of 15 the reproduction request.

19. The method of claim 17, wherein the external terminal, in case where a file corresponding to a file path transmitted to the mobile terminal is a file stored in an external server,
receives data for reproducing the file from the external server when a file reproduction request is received from the mobile terminal, and
transmits the received data to the mobile terminal.

20. The method of claim 17, further comprising:
establishing a network including the mobile terminal as a host terminal, and first and second external terminals;
setting the first external terminal of the first and second external terminals as a host terminal based on a control input; and
transmitting information related to the second external terminal to the first external terminal to establish a new network having the first external terminal set as the host terminal.

* * * * *